US009538482B2

(12) United States Patent
Das et al.

(10) Patent No.: US 9,538,482 B2
(45) Date of Patent: Jan. 3, 2017

(54) METHODS OF REVERSE LINK POWER CONTROL

(71) Applicant: Alcatel Lucent USA, Inc., Murray Hill, NJ (US)

(72) Inventors: Suman Das, Colonia, NJ (US); Shirish Nagaraj, Cedar Knolls, NJ (US); Harish Viswanathan, Morristown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 267 days.

(21) Appl. No.: 13/959,083

(22) Filed: Aug. 5, 2013

(65) Prior Publication Data

US 2013/0322338 A1  Dec. 5, 2013

Related U.S. Application Data

(62) Division of application No. 13/494,305, filed on Jun. 12, 2012, now Pat. No. 8,543,154, which is a division
(Continued)

(51) Int. Cl.
*H04W 52/36* (2009.01)
*H04W 52/24* (2009.01)
(Continued)

(52) U.S. Cl.
CPC .......... *H04W 52/243* (2013.01); *H04L 5/0016* (2013.01); *H04L 27/0008* (2013.01);
(Continued)

(58) Field of Classification Search
CPC ...... H04W 80/04; H04W 84/12; H04W 88/06; H04W 88/08; H04W 84/18; H04W 84/72
See application file for complete search history.

(56) References Cited

U.S. PATENT DOCUMENTS 5,401,504 A   3/1995  Das et al.
6,308,080 B1 * 10/2001  Burt et al. ............. 455/522
(Continued)

FOREIGN PATENT DOCUMENTS

JP  2006-087171  3/2003
KR  10-2003-0016391  2/2003
(Continued)

OTHER PUBLICATIONS

Korean Office Action dated Oct. 10, 2013 in corresponding Application No. 10-2008-7019660.
(Continued)

*Primary Examiner* — Hassan Phillips
*Assistant Examiner* — Prenell Jones
(74) *Attorney, Agent, or Firm* — Harness, Dickey & Pierce, P.L.C.

(57) ABSTRACT

Methods of reverse link power control are provided. A first example method includes first adjusting OFDMA transmission power based on first feedback signals during an OFDMA transmission and second adjusting OFDMA transmission power based on second feedback signals during periods between OFDMA transmissions. A second example method includes sending first power adjustment indicators based on measured OFDMA SINRs when receiving OFDMA transmissions from a mobile station and sending second power adjustment indicators based on estimated OFDMA SINRs when not receiving OFDMA transmissions from the mobile station. A third example method includes receiving a plurality of interference indicating signals from different base stations and determining whether to adjust a maximum transmit power threshold based on the plurality of interference indicating signals, the maximum transmit power threshold indicating the maximum permitted trans-
(Continued)

mission power level below which transmissions are constrained.

5 Claims, 8 Drawing Sheets

Related U.S. Application Data of application No. 11/356,242, filed on Feb. 17, 2006, now Pat. No. 8,260,340.

(51) Int. Cl.
   *H04L 5/00* (2006.01)
   *H04L 27/00* (2006.01)
   *H04W 52/14* (2009.01)
   *H04W 52/16* (2009.01)

(52) U.S. Cl.
   CPC ......... *H04W 52/146* (2013.01); *H04W 52/16* (2013.01); *H04W 52/24* (2013.01); *H04W 52/36* (2013.01); *H04L 5/0048* (2013.01); *H04W 52/247* (2013.01); *H04W 52/362* (2013.01); *H04W 52/367* (2013.01)

(56) References Cited

U.S. PATENT DOCUMENTS

| | | | |
|---|---|---|---|
| 8,260,340 B2 | 9/2012 | Das et al. | |
| 2002/0123365 A1* | 9/2002 | Thorson et al. | 455/524 |
| 2003/0083008 A1* | 5/2003 | Baker | H04B 7/15535 455/17 |
| 2003/0104831 A1* | 6/2003 | Razavilar | H04L 1/0002 455/522 |
| 2003/0123425 A1* | 7/2003 | Walton | H04W 52/24 370/341 |
| 2004/0179469 A1 | 9/2004 | Attar et al. | |
| 2004/0213185 A1* | 10/2004 | Oh et al. | 370/335 |
| 2005/0130672 A1* | 6/2005 | Dean | G01S 1/68 455/456.1 |
| 2005/0207367 A1* | 9/2005 | Onggosanusi | H04L 1/0003 370/315 |
| 2006/0019694 A1* | 1/2006 | Sutivong et al. | 455/522 |
| 2006/0099984 A1* | 5/2006 | Brusch | H04W 52/34 455/522 |
| 2007/0082620 A1* | 4/2007 | Zhang | H04W 52/24 455/69 |
| 2007/0140168 A1 | 6/2007 | Laroia et al. | |
| 2007/0165577 A1* | 7/2007 | Baker | H04W 52/327 370/335 |
| 2007/0195734 A1 | 8/2007 | Das et al. | |
| 2007/0197251 A1 | 8/2007 | Das et al. | |
| 2009/0023466 A1 | 1/2009 | Sutivong et al. | |
| 2009/0074098 A1 | 3/2009 | Wu et al. | |
| 2009/0146791 A1* | 6/2009 | Jantunen | G06K 7/0008 340/10.2 |
| 2012/0270582 A1* | 10/2012 | Mese | H04W 28/24 455/501 |

FOREIGN PATENT DOCUMENTS

| | | |
|---|---|---|
| KR | 10-2004-0004462 | 1/2004 |
| WO | WO 02/05441 A2 | 1/2002 |
| WO | WO 02/49305 A2 | 6/2002 |

OTHER PUBLICATIONS

Jeremy Laine: "Interference Estimation in a Multicellular OFDMA Environment, Master Thesis" Thesis, Jul. 2004 (Jul. 2004), pp. 1-53, XP002417572, pp. 17-19.
International Search Report and Written Opinion of the International Searching Authority (dated Oct. 16, 2007) for counterpart PCT application No. PCT/US2007/003895 are provided for the purposes of certification under 37 C.F.R. §§ 1.97(e) and 1.704(d).
Chinese Office Action dated Nov. 23, 2010, issued in counterpart Application No. 200780005689.5 and English translation thereof.
Japanese Office Action and English translation thereof dated Mar. 21, 2012.
Office Action in Taiwan Patent Application No. 096106364 mailed Jan. 28, 2013, with English language translation of Office Action.

* cited by examiner

CONVENTIONAL OFDMA SYSTEM

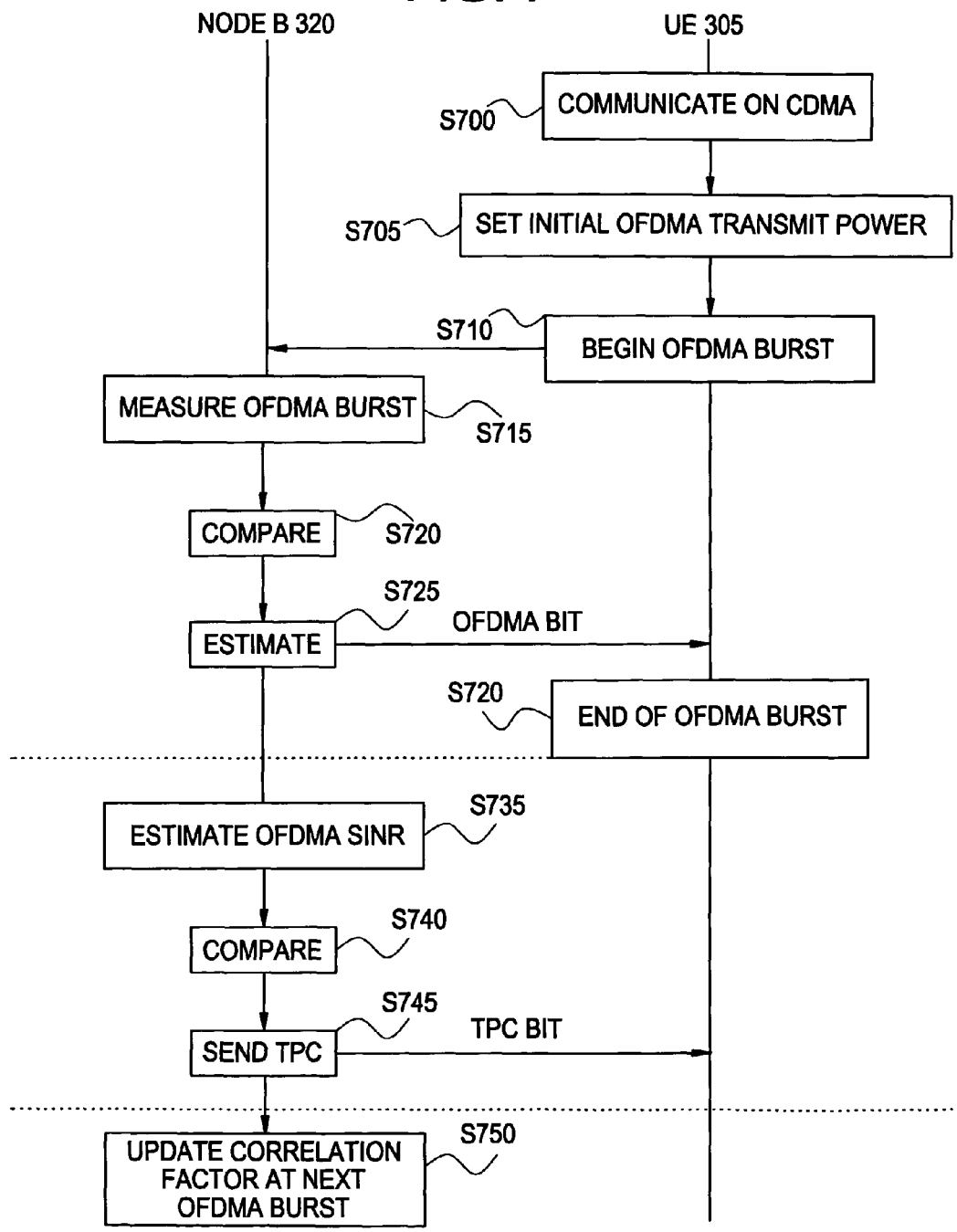

METHODS OF REVERSE LINK POWER CONTROL

This is a Divisional of U.S. patent application Ser. No. 13/494,305, filed Jun. 12, 2012, which is a Divisional application of U.S. patent application Ser. No. 11/356,242, filed Feb. 17, 2006, the contents of each of which are hereby incorporated by reference in their entirety.

BACKGROUND OF THE INVENTION

1. Field of the Invention

Example embodiments of the present invention relate generally to communications systems, and, more particularly, to wireless communication systems.

2. Description of the Related Art

Conventional wireless communication systems include one or more base stations or base station routers, which may also be referred to as access points, node-Bs or access networks, for providing wireless connectivity to one or more mobile units, which may also be referred to using terms such as user equipment, subscriber equipment, and access terminals. Examples of mobile units include cellular telephones, personal data assistants, smart phones, text messaging devices, laptop/notebook computers, desktop computers and the like. Each base station may provide wireless connectivity to one or more mobile units, such as the mobile units in a geographical area, or cell, associated with the base station. Alternatively, a base station router may be used to provide wireless connectivity to the mobile units.

Messaging sent from a base station or base station router to one or more mobile units is generally referred to as "forward link" or "downlink" messaging. Messaging sent from a mobile unit to a base station or base station router is generally referred to as "reverse link" or "uplink" messaging.

Orthogonal frequency division multiplexing (OFDM) is an efficient modulation scheme for signal transmission over frequency-selective channels. In OFDM, a wide bandwidth is divided into multiple narrow-band sub-carriers, which are arranged to be orthogonal with each other. The signals modulated on the sub-carriers are transmitted in parallel.

OFDM may be used to support multiple access for multiple subscribers through time division multiple access (TDMA), in which each subscriber uses all the sub-carriers within its assigned time slots. Orthogonal frequency division multiple access (OFDMA) is another method for multiple access, using the basic format of OFDM. In OFDMA, multiple subscribers simultaneously use different sub-carriers, in a fashion similar to frequency division multiple access (FDMA) (e.g., for each "shared" sub-carrier, frequency divisions are used to allow multiple access).

OFDMA divides a signal into sub-channels (i.e., groups of carriers), with each sub-channel being allocated to a different subscriber. Different sub-channels may then be combined from various carriers. Each subscriber can be treated separately, independent of location, distance from the base station, interference and power requirements. Various modulations can be used for each of the carriers in the system to provide improved coverage and throughput. The sub-channel structure of the OFDMA enhancement enables more efficient duplexing techniques, such as Frequency Division Duplexing (FDD) and Time Division Duplexing (TDD), and creates a signal with reduced interference and capable of higher data throughput. In FDD systems, both forward link and reverse link transmissions occur simultaneously on different carriers.

FIG. 1 illustrates a conventional OFDMA system 100. As shown in FIG. 1, the OFDMA system 100 includes a plurality of user equipments (UEs) 105 in communication with one or more serving Node Bs 120/125 over an air interface. The plurality of Node Bs are connected to a radio network controller (RNC) 130 with a wired interface. Alternatively, while not shown in FIG. 1, the functionality of both the RNC 130 and Node Bs 120/125 (alternatively referred to as "base stations") may be collapsed into a single entity referred to as a "base station router". The RNC 130 accesses an internet 160 through a gateway support node (GSN) 150 and/or accesses a public switched telephone network (PSTN) 170 through a mobile switching center (MSC) 140.

FIG. 2 illustrates a transmitter 200 in a conventional OFDMA system. In an example, the transmitter 200 of FIG. 2 is employed within a transmitting entity (e.g., Node B 120/125, UE 105/110, etc.) within the conventional OFDMA system 100 of FIG. 1.

As shown in FIG. 2, the transmitter 200 includes a modulator 210, a serial-to-parallel (S2P) converter 220, an Inverse Fast Fourier Transformer (IFFT) module 230, a cyclic prefix inserter 240 and a time domain filter 250. The IFFT module 230 includes N ports for receiving modulation symbols. Each of the N ports is associated with an orthogonal sub-carrier. IFFT module 230 is operable to use an N×N IFFT matrix to perform transform operations on its inputs, wherein the entries of the matrix $F_{j,k}$ are defined as $F_{j,k}=e-2^{\pi i j k/n}$, j, k=0, 1, 2, . . . , n−1 and $i=\sqrt{1}$.

Encoded data symbols are provided as input to modulator 210. Modulator 210 uses well-known modulation techniques, such as BPSK, QPSK, 8PSK, 16QAM and 64QAM, to convert the encoded data symbols into K modulation symbols Sk which are then provided as input to S2P converter 120, where K≤N. The S2P converter 220 outputs parallel streams of modulation symbols, which are provided as inputs to one or more of the N ports of the IFFT module 230 associated with orthogonal sub-carriers over which the encoded data symbols are to be transmitted. In the IFFT module 230, an inverse fast Fourier transformation is applied to the modulation symbols Sk to produce a block of chips cn, where n=0, . . . , N−1. The cyclic prefix inserter 240 copies the last Ncp chips of the block of N chips and prepends them to the block of N chips producing a prepended block. The prepended set is then filtered through time domain filter 250 and subsequently modulated onto a carrier before being transmitted.

OFDMA systems provide reduced interference and higher data rates on the reverse link, as compared to conventional Code Division Multiple Access (CDMA), due to the in-cell orthogonality property of OFDMA transmissions. However, OFDMA comes at the cost of increased signaling and a failure to provide bandwidth sharing for users transmitting at lower data rates and/or requiring fast access to a carrier. In contrast, CDMA systems allow multiple subscriber access without explicit request-and-grant mechanisms, as present in conventional OFDMA, and this may increase user access to the carrier for transmissions.

Power control is a critical problem for the reverse link in CDMA systems because CDMA systems may experience significant in-cell and outer-cell interference. OFDMA systems typically experience less in-cell interference than CDMA systems due to the orthogonality property of OFDMA, and thereby OFDMA systems may employ "looser" power control requirements since interference present in an OFDMA system may be substantially limited to outer-cell interference. However, reverse link power control in OFDMA systems remains a problem in conventional OFDMA systems not withstanding the lesser in-cell interference. For example, effective rate control on the reverse link in OFDMA systems may be difficult to achieve without a reverse link transmission power to reverse link data rate mapping.

Since OFDMA transmissions are scheduled by the base-station by giving different portions of available bandwidth to different users, the transmissions per user are typically "bursty" by nature. Accordingly, it is inefficient to maintain a constant pilot transmitted by all users for performing closed loop OFDMA power control. On the other hand, purely open loop power control techniques are limited in their efficiency since open loop power control techniques typically do not maintain a tight control of outer-cell interference, and a prediction of a received signal-to-interference+noise ratio (SINR) for a given transmit power is less accurate. Accordingly, because OFDMA systems do not transmit continuous pilot signal transmissions, it is more difficult to control reverse link transmission power at all users within the cell because reverse link power control must be performed individually for each user.

SUMMARY OF THE INVENTION

An example embodiment of the present invention is directed to a method of controlling reverse link transmission power in a wireless communications network, including first measuring a first type of interference, second measuring a second type of interference, determining a ratio between the first and second measurements and broadcasting the determined ratio to a plurality of mobile units.

Another example embodiment of the present invention is directed to a method of controlling reverse link transmission power in a wireless communications network, including receiving a broadcasted ratio indicating a ratio between two different types of interference and calculating a power level for reverse link transmissions based on the received broadcasted ratio.

Another example embodiment of the present invention is directed to a method of controlling reverse link transmission power in a wireless communications network, including first adjusting OFDMA transmission power based on first feedback signals during an OFDMA transmission and second adjusting OFDMA transmission power based on second feedback signals during periods between OFDMA transmissions.

Another example embodiment of the present invention is directed to a method of determining a maximum permitted transmission power level, including receiving a plurality of interference indicating signals from different base stations and determining whether to adjust a maximum transmit power threshold based on the plurality of interference indicating signals, the maximum transmit power threshold indicating the maximum permitted transmission power level below which transmissions are constrained.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein:

FIG. 7 illustrates an OFDMA reverse link power control process according to another example embodiment of the present invention.

DETAILED DESCRIPTION OF EXAMPLE EMBODIMENTS

In order to better understand the present invention, a hybrid Code Division Multiple Access (CDMA)/Orthogonal Frequency Division Multiple Access (OFDMA) system according to an example embodiment of the present invention will be described first. Then, an example of controlling OFDMA reverse link power in the example hybrid CDMA/OFDMA system will be given, followed by a method of establishing a maximum power level at which mobile station's may transmit within the hybrid OFDMA/CDMA system.

Hybrid CDMA/OFDMA System

Figure 3:
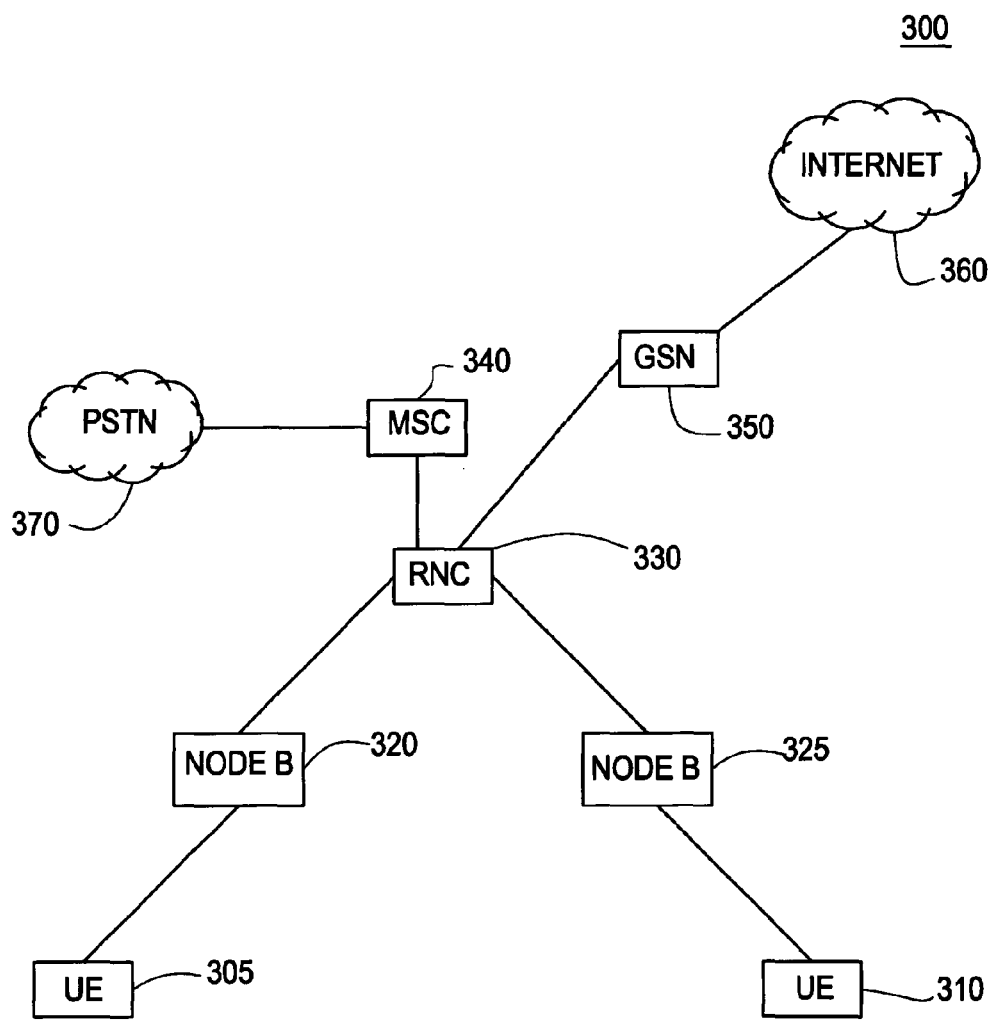
FIG. 3 illustrates hybrid OFDMA/CDMA system according to an example embodiment of the present invention.

FIG. 3 illustrates a wireless communications system (hereinafter "hybrid OFDMA/CDMA system") 300 according to an example embodiment of the present invention. As shown in FIG. 3, the OFDMA system 300 includes a plurality of user equipments (UEs) 305 in communication with one or more serving Node Bs 320/325 over an air interface. The plurality of Node Bs are connected to a radio network controller (RNC) 330 with a wired interface. Alternatively, while not shown in FIG. 3, the functionality of both the RNC 330 and Node Bs 320/325 (alternatively referred to as "base stations") may be collapsed into a single entity referred to as a "base station router". The RNC 330 accesses an internet 360 through a gateway support node (GSN) 350 and/or accesses a public switched telephone network (PSTN) 370 through a mobile switching center (MSC) 340.

Figure 1:
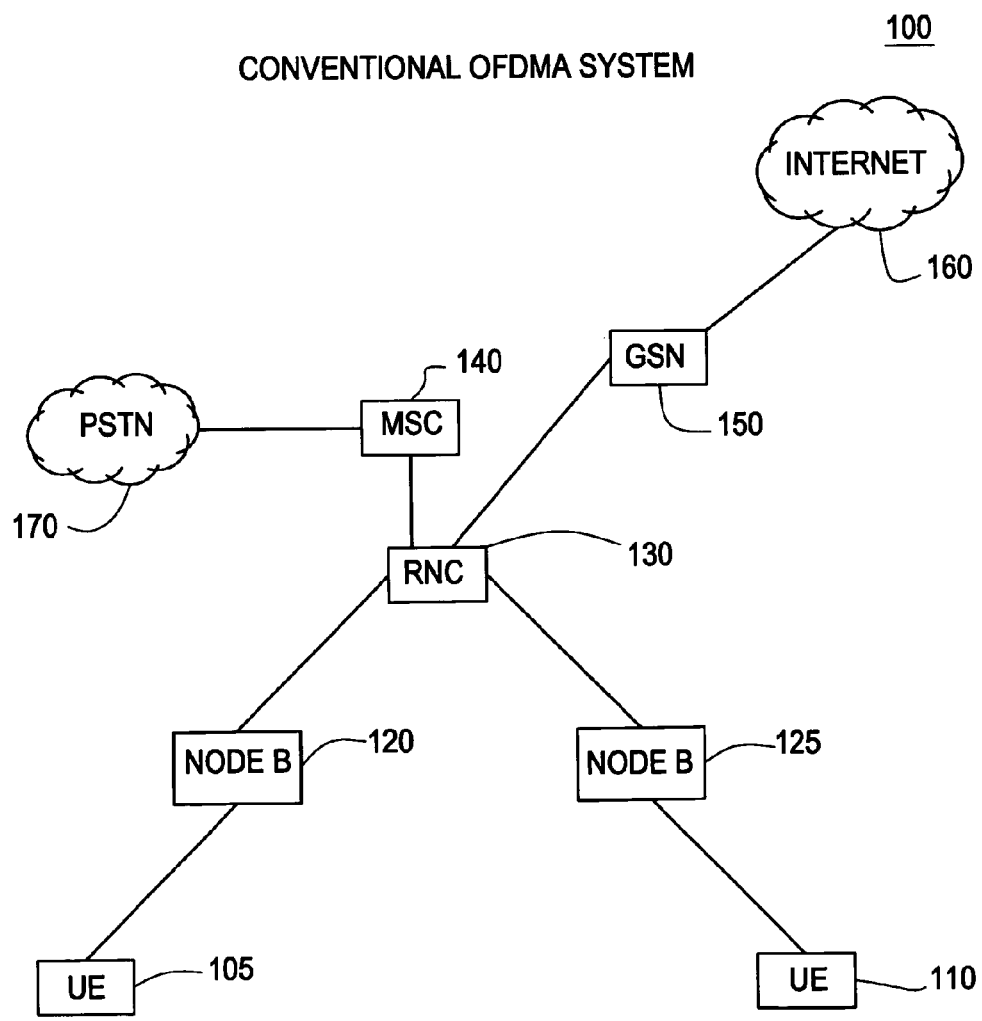
FIG. 1 illustrates a conventional OFDMA system.
Figure 2:
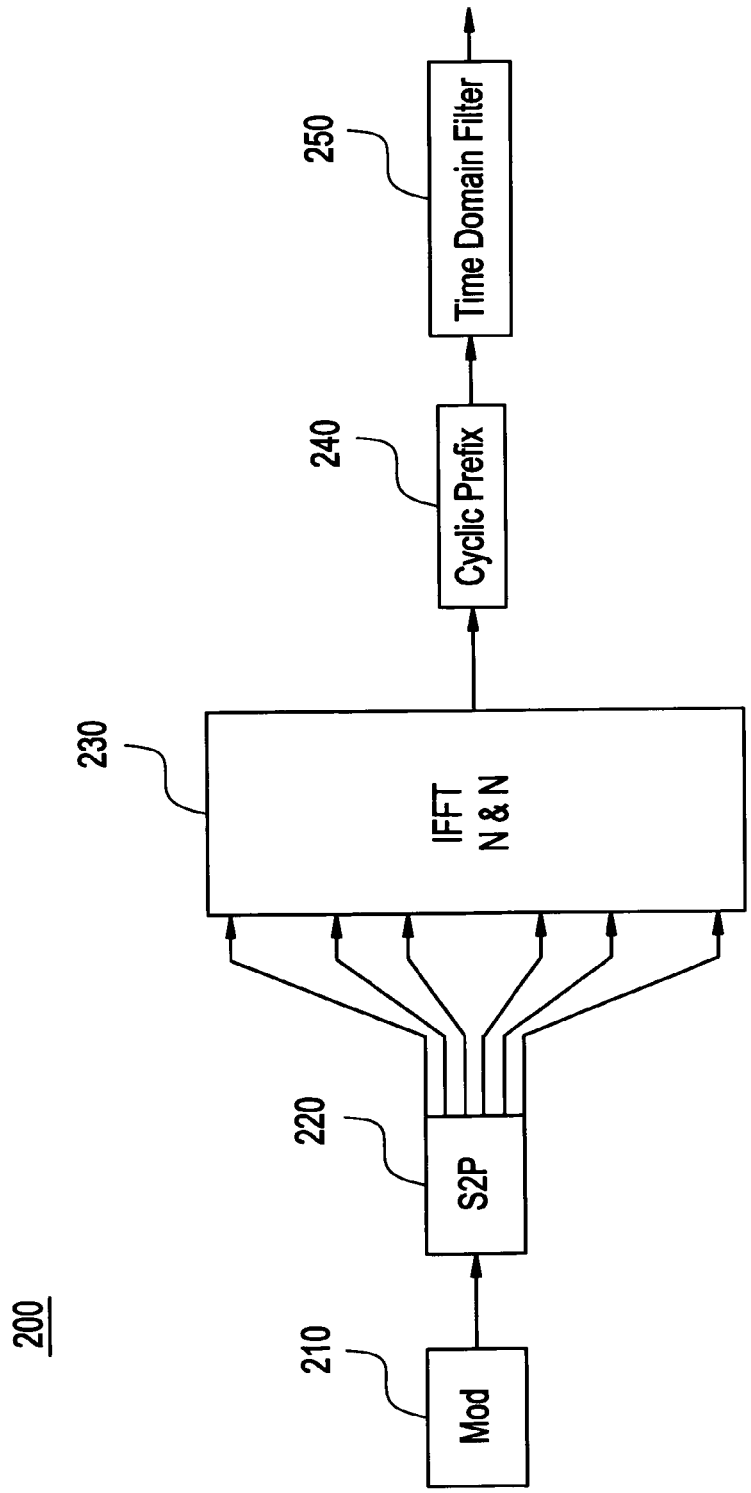
FIG. 2 illustrates a transmitter in the conventional OFDMA system of FIG. 1.

While the hybrid CDMA/OFDMA system 300 of FIG. 3 superficially resembles the OFDMA system 100 of FIG. 1, the hybrid CDMA/OFDMA system 300 of FIG. 3 is further operable to communicate OFDMA type signals over a set of dynamically assigned orthogonal sub-carriers and CDMA type signals over a set of pre-allocated orthogonal sub-carriers, wherein OFDMA type signals are signals generated in accordance with well-known OFDMA techniques and CDMA type signals are signals generated in accordance with well-known CDMA techniques.

In an example, the CDMA type signals are transmitted over pre-allocated orthogonal sub-carriers and, thus, do not require the dynamic assignment of orthogonal resources (e.g. sub-carriers). The CDMA type signals may be signals associated with users with bursty and periodic traffic patterns. As will now be described, the hybrid OFDMA/CDMA system 300 may be a multi-carrier system in which available bandwidth is divided into a set of orthogonal sub-carriers.

Figure 4:
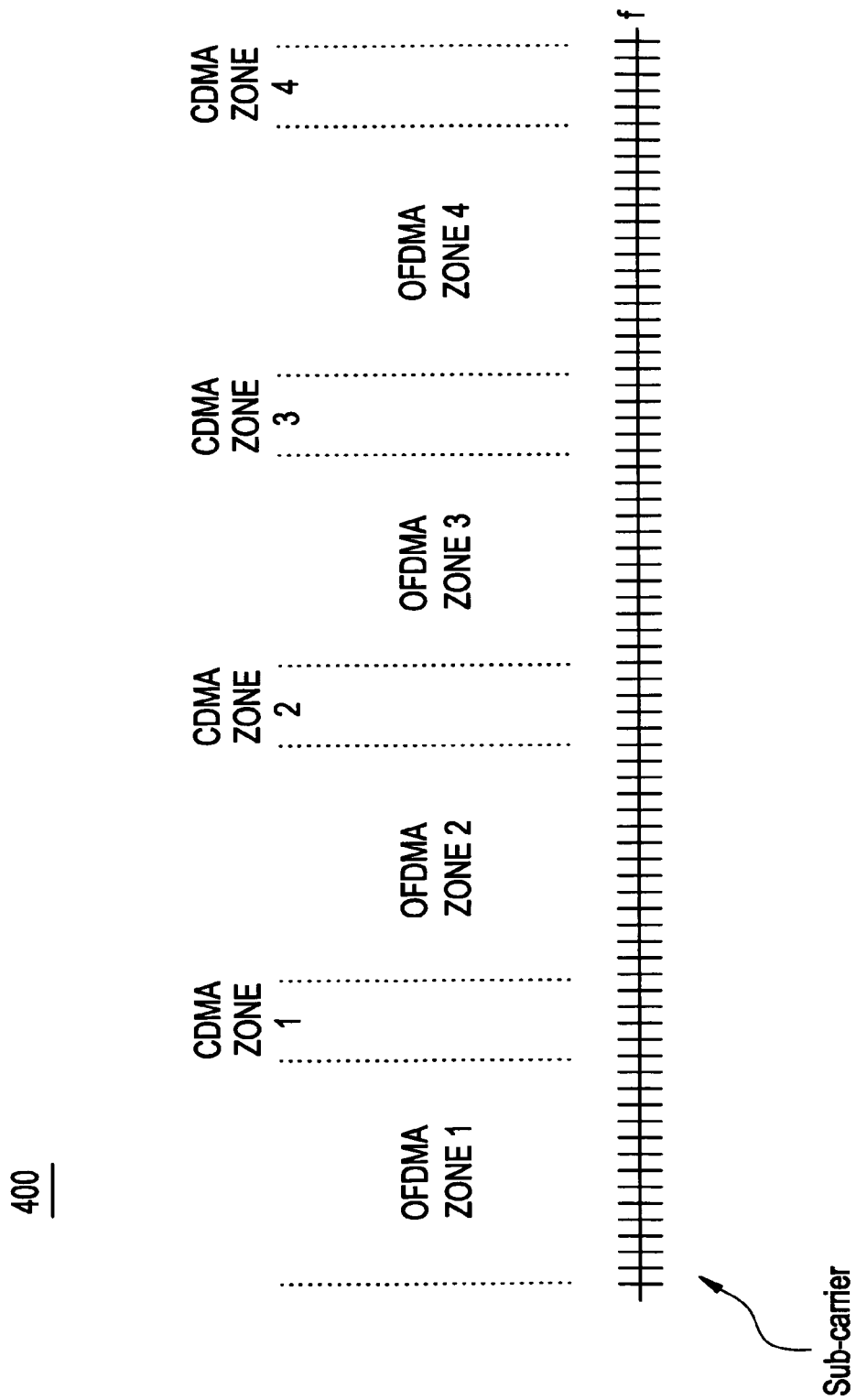
FIG. 4 illustrates a bandwidth allocation for the hybrid OFDMA/CDMA system of FIG. 3 according to an example embodiment the present invention.

FIG. 4 illustrates a bandwidth allocation 400 for the hybrid OFDMA/CDMA system 300 of FIG. 3 according to an example embodiment the present invention. In the example embodiment of FIG. 4, available bandwidth is divided into a set of orthogonal sub-carriers. The set of orthogonal sub-carriers are categorized into two groups. The first group, referred to herein as OFDMA group, includes orthogonal sub-carriers used for the transmission of OFDMA signals. The second group, referred to herein as CDMA group, includes orthogonal sub-carriers used for the transmission of CDMA type signals. The OFDMA and CDMA groups include one or more sub-groups referred to herein as OFDMA and CDMA zones, respectively. Each zone includes at least one orthogonal sub-carrier. In an example, the CDMA zones are non-adjacent to each other and distributed at even intervals among the bandwidth allocation 400 with intervening OFDMA zones. In another example, two or more of the CDMA zones are adjacent to each other. In yet another example, the CDMA zones occupy the entire bandwidth (e.g., an entirety of the bandwidth allocation 400) such that no bandwidth is reserved for OFDMA zones.

In the example embodiment of FIG. 4, a traffic channel including orthogonal sub-carriers in the OFDMA group is referred to hereinafter as an OFDMA traffic channel, whereas a traffic channel including orthogonal sub-carriers in the CDMA group is referred to hereinafter as an CDMA traffic channel. As mentioned earlier, the OFDMA type signals are signals generated in accordance with well-known OFDMA techniques, and CDMA type signals are signals generated in accordance with well-known CDMA techniques. In another example, OFDMA type signals may be signals generated in accordance with the well-known Interleaved Frequency Division Multiple Access (IFDMA) technique, and/or any type of technique for generating signals over a Frequency Division Multiple Access (FDMA) system. Similarly, the CDMA type signals may be generated in accordance with only CDMA techniques, and/or with CDMA and IFDMA techniques.

Figure 5:
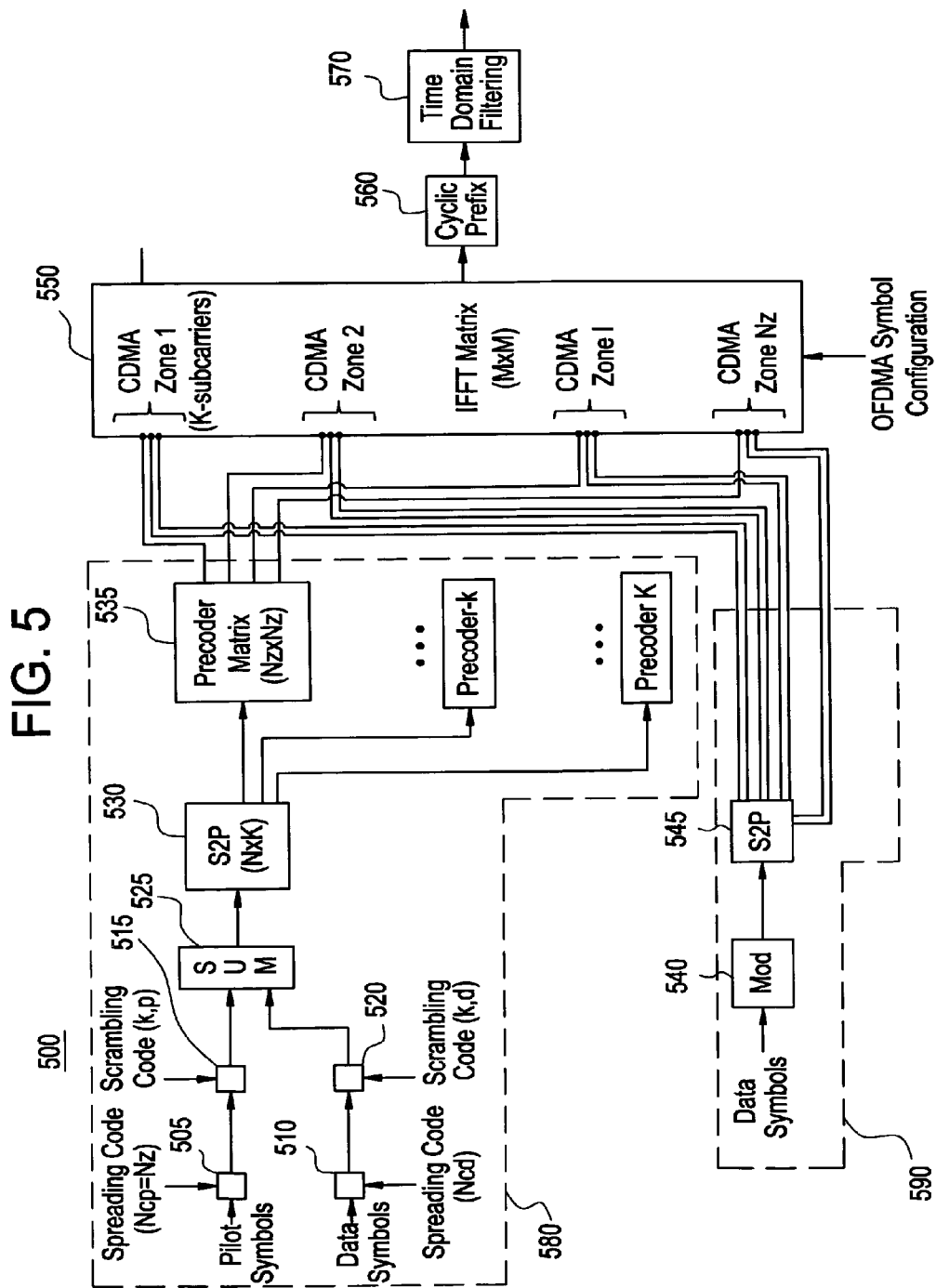
FIG. 5 illustrates a schematic diagram of a transmitter in the hybrid OFDMA/CDMA system of FIG. 3 according to an example embodiment of the present invention

FIG. 5 illustrates a schematic diagram of a transmitter 500 according to an example embodiment of the present invention. In an example, the transmitter 500 of FIG. 5 may be employed within a transmitting entity (e.g., Node B 320/325, UE 305/310, etc.) within the hybrid CDMA/OFDMA system 300 of FIG. 3.

In the example embodiment of FIG. 5, the transmitter 500 includes a first portion 580 for processing CDMA type signals, and a second portion 590 for processing OFDMA type signals. The first portion 580 includes multipliers 505, 510, 515, 520, a summer 525, a serial-to-parallel (S2P) converter 530, K pre-coders 535, an Inverse Fast Fourier Transform (IFFT) module 550, a cyclic prefix inserter 560, and a time domain filter 570. The second portion 590 includes a modulator 540, a S2P converter 545, an IFFT module 550, a cyclic prefix inserter 560 and a time domain filter 570. The pre-coders 535 are configured to use a Discrete Fourier Transform (DFT) matrix and/or a matrix based on a frequency domain channel to perform a transform operation on its inputs. Each pre-coder 535 includes Nz output ports. The IFFT module 550 is configured to use an IFFT matrix to perform a transform operation on its inputs. The IFFT module 550 includes NFFT input ports, wherein the NFFT input ports include KxNz ports associated with orthogonal sub-carriers belonging to CDMA zones, and NFFT-KxNz input ports associated with orthogonal sub-carriers belonging to OFDMA zones.

In the example embodiment of FIG. 5, in the first portion 580, pilot symbols and encoded data symbols are provided as inputs into multipliers 505, 510. The pilot and encoded data symbols are spread using spreading codes, such as Walsh codes, with spreading factors Ncp and Ncd, respectively. In an example, the spreading factor Ncp is equal to Nz, which is a number of CDMA zones in the bandwidth allocation 400 of the hybrid OFDMA/CDMA system 300. The spread pilot and data symbols are subsequently scrambled in multipliers 515, 520 using a pilot and a data scrambling code, such as Pseudo-random Noise (PN) codes, to produce pilot and data chips, respectively, wherein the scrambling codes have a period N and N>>Ncp, Ncd. In an example, the scrambling codes may be CDMA zone specific. In another example, the scrambling codes may have different offsets for the pilot and data branches of the first portion 580.

In the example embodiment of FIG. 5, the pilot and data chip streams are code multiplexed in the summer 525 to produce a code multiplexed signal, wherein the code multiplexed signal includes KxNz code multiplexed chips. In another example, the pilot and data chip streams are time multiplexed. A CDMA type signal may be construed to be the code or time multiplexed chip signal or any signal derived from the code or time multiplexed chip signal.

In the example embodiment of FIG. 5, the code multiplexed signal is provided as an input to the S2P converter 530. The S2P converter 530 distributes the code multiplexed chips equally among each of the K pre-coders 535. In an example, the code multiplexed chips may be provided as a block of Nz code multiplexed chips. For example, the first Nz code multiplexed chips are provided as an input to the first pre-coder 535, the next Nz code multiplexed chips are provided as an input to the second pre-coder 535, and so on. In another example, the S2P converter 530 may distribute the code multiplexed chips unevenly or unequally among K or less pre-coders 535, and the block of code multiplexed chips may be a size different from Nz.

In the example embodiment of FIG. 5, the pre-coders 535 may use a matrix to perform a transform operation to transform an input vector in the time domain into an output vector in the frequency domain. In an example, both the input and output vectors of pre-coders 535 include the same (e.g., Nz) elements or chips. In another example, the pre-coders 535 are Discrete Fourier Transformers (DFT) that use a DFT matrix F of size NzxNz to transform the input vector including Nz code multiplexed chips from the time domain to the frequency domain. The entries for matrix F may be expressed as $$F_{j,k} = e^{-i2\pi jk/N_z} \qquad \text{Equation 1}$$

wherein j, k=0, 1, 2, . . . , n−1 and i=$\sqrt{-1}$. If the code multiplexed chips at the input of DFT pre-coder are defined as vector s, where s=[s1, s2, s3, . . . , sNz]$^T$ and T denotes the transpose operation, the output of DFT pre-coder can be defined as vector x, which is expressed as $$x = \frac{1}{\sqrt{N_z}} Fs = [x_1, \ldots, x_{N_z}]^T \qquad \text{Equation 2}$$

wherein Nz denotes the number of pre-coded elements or chips.

In another example embodiment of the present invention, referring to FIG. 5, the pre-coders 535 may use an identity matrix to transform the code multiplexed chips into the frequency domain from the time domain. Additionally, the pre-coders 535 may use a matrix which is channel sensitive allowing for pre-equalization techniques to be applied to the transformation.

In the example embodiment of FIG. 5, each of the Nz output ports of the K pre-coders 535 are separately mapped to ports of IFFT 550 associated with orthogonal sub-carriers belonging to CDMA zones. In an example, the mapping of the Nz output ports to the input ports of IFFT module 550 may be reconfigurable based on which of the orthogonal sub-carriers the CDMA type signals are scheduled for transmission.

In the example embodiment of FIG. 5, in the second portion 590, encoded data symbols are modulated by the modulator 540 using well-known modulation techniques, such as BPSK, QPSK, 8PSK, 16QAM, 64QAM, etc., to convert the data symbols into K modulation symbols Sk which are then transferred to the S2P converter 545, wherein K≤N. The S2P converter 545 outputs parallel streams of modulation symbols which are provided as inputs to one or more ports of the IFFT module 550 associated with orthogonal sub-carriers over which the encoded data symbols are to be transmitted.

In the example embodiment of FIG. 5, in the IFFT module 550, an inverse fast Fourier transformation is applied to the modulation symbols Sk and to pre-coded chips (e.g., output of the pre-coder 535) to produce a block of chips $c_n$, wherein n=0, ..., NFFT−1. The cyclic prefix inserter 560 copies the last $N_{cp}$ chips of the block of NFFT chips and prepends them to the block of NFFT chips producing a prepended block. The prepended set is then filtered through time domain filter 570 and subsequently modulated onto a carrier before being transmitted.

CDMA Reverse Link Power Control

Examples of CDMA reverse link control processes are described in US patent application UNKNOWN#, entitled "METHODS OF REVERSE LINK POWER CONTROL", filed concurrently with this application by the inventors of the subject application, hereby incorporated by reference in its entirety. Accordingly, a further description of CDMA reverse link power control processes has been omitted except as is relevant to OFDMA reverse link power control processes, which will be discussed below in greater detail.

First OFDMA Reverse Link Power Control Example

Figure 6A:
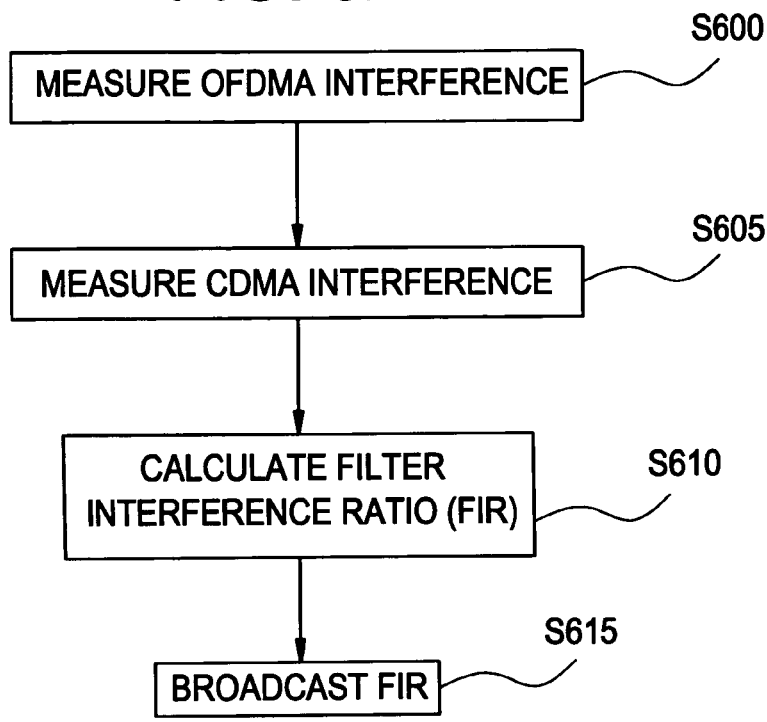
FIGS. 6A and 6B illustrate an OFDMA reverse link power control process according to another example embodiment of the present invention.
Figure 6B:
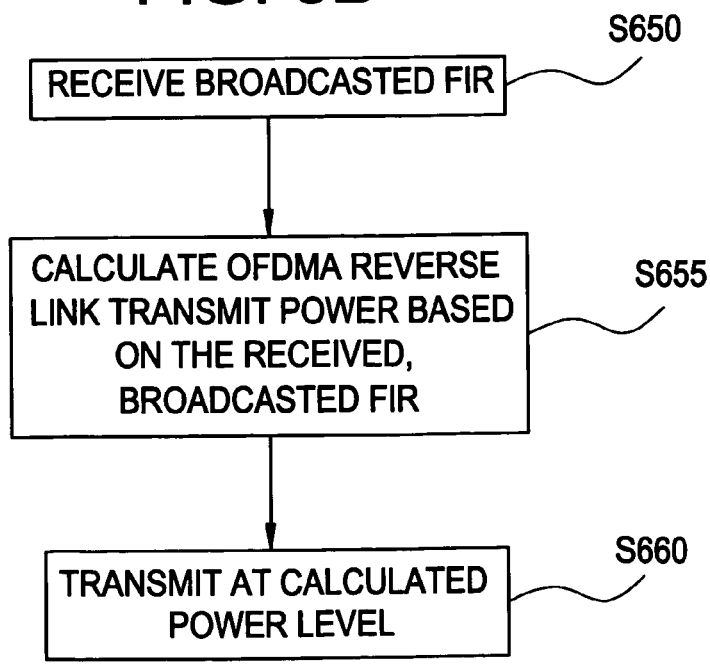

FIGS. 6A and 6B illustrate an OFDMA reverse link power control process according to another example embodiment of the present invention. The OFDMA reverse link power control process of FIGS. 6A and 6B is described below with respect to the hybrid CDMA/OFDMA system 300 of FIG. 3. More specifically, the steps of the process of FIG. 6A are described as being performed at the Node B 320, and the steps of the process of FIG. 6B are described as being performed at the UE 305.

As shown in FIG. 6A, the Node B 320 analyzes a received signal spectrum to obtain a measure of a "total" OFDMA interference in step S600. Generally, step S600 can be interpreted as an outer-cell interference measurement, because OFDMA is characterized as having a relatively low in-cell interference measure. In an example, a majority of the measured OFDMA interference resides within the OFDMA zones of the bandwidth allocation 400 of FIG. 4.

In step S605, the Node B 320 again analyzes the received signal spectrum to obtain a measure of the CDMA interference. It will be appreciated that the measured CDMA interference can be either a pre- or post-interference cancellation (IC) measurement. In an example, if the measurement of the CDMA interference is performed with post-interference cancellation, the Node B 320 measures the CDMA signal spectrum prior to interference cancellation, and then measures the residual interference-to-total interference ratio after the interference cancellation. The ratio of these two quantities is a measure of the post-interference cancellation CDMA interference.

The Node B 320 uses the measured OFDMA interference (step S600) and CDMA interference (step S605) to calculate a filtered interference ratio (FIR), which is a ratio of the measured OFDMA interference to the measured CDMA interference, in step S610. FIR calculation is well known in the art and will not be described further for the sake of brevity. After the FIR is calculated, the Node B 320 broadcasts the calculated FIR to all UEs within its cell in step S615 using a forward link or downlink common channel. The broadcast of step S615 may be performed in a variety of ways. For example, a differential broadcast scheme may be employed by the Node B 320 wherein an initial calculated FIR is sent to listening mobile stations. Thereafter, smaller values representing differences between previous FIRs are sent. However, periodically the complete FIR is re-broadcast to account for new users entering into communication with the Node B 320 and/or to reduce the effects of signaling errors.

In an alternative example, the Node B 320 may broadcast the FIR in step S615 separately on CDMA and OFDMA. In yet another alternative example, interference activity bits (IABs) are broadcast to mobile stations. The measured CDMA interference and measured OFDMA interference are compared to respective interference thresholds. Respective IABs are set to a first logic level (e.g., a higher logic level or "1") if the comparison indicates a measured interference above or equal to the threshold and are set to a second logic level (e.g., a lower logic level or "0") if the comparison indicates a measured interference below the threshold. In this example, two separate IABs are sent by the Node B 320 to correspond to indicate whether the measured CDMA interference (step S605) and the measured OFDMA interference (step S600) exceed a CDMA interference threshold and an OFDMA interference threshold, respectively.

Referring now to FIG. 6B, the UE 305 receives the broadcasted FIR in step S650. In step S655, the UE 305 calculates a power level at which to transmit for OFDMA reverse link transmissions based on the broadcasted FIR. The calculation of step S655 will now be described in greater detail.

The following terms are used in the example calculation of step S655:

"To" is the target SINR for OFDMA pilot signals;
"Tc" is the target SINR for CDMA pilot signals;
"Pc(t)" is the CDMA pilot transmit power spectral density, transmitted from the UE 305, at slot t;
"Po(t)" is the unconstrained OFDMA nominal pilot power per tone at slot t;
"ΔI(t)" is the periodically broadcasted FIR sent by the Node B 320 at step S615 and received by the UE 305 at step S650 at time slot t;
"I_OFDMA(t)" is the measured OFDMA interference in step S600 at slot t; and
"I_CDMA(t)" is the measured CDMA interference in step S605 at slot t.

With the above assumptions, the filtered FIR sent by the Node B 320 at step S615 and received by the UE 305 is expressed as $$\Delta I(t)=10 \log 10[I\_OFDMA(t)/I\_CDMA(t)] \quad \text{Equation 3}$$

The target SINR ratio $\Delta\Gamma$ is given by:

$$\Delta\Gamma=\Gamma o/\Gamma c \quad \text{Equation 4}$$

The UE 305 may thereby adjust the OFDMA pilot power per tone Po(t) as follows:

$$Po(t)=\alpha(t)*Pc(t) \quad \text{Equation 5}$$

wherein $\alpha(t)$ is a calculated power ratio, expressed as $$\alpha(t)=\Delta\Gamma*10^{\Delta I(t)/10} \quad \text{Equation 6}$$

Returning to FIG. 6B, the UE 305 transmits OFDMA signals within the OFDMA zones in accordance with the calculated power level or Po(t) in step S660.

A readily apparent advantage in the above-described OFDMA reverse link power control process of FIG. 6A/6B is that the conventional "fast" OFDMA power control wherein dedicated control bits are sent to particular UEs is avoided with the "broadcast" nature of the example approach. Thereby, processing is offloaded from the Node Bs to the UEs for calculating OFDMA reverse link power adjustments, which conserves system resources.

Second OFDMA Reverse Link Power Control Example

Generally, CDMA transmissions within the CDMA zones of the bandwidth allocation 400 of the hybrid CDMA/OFDMA system 300 of FIG. 3 can be said to be "continuous" while OFDMA transmissions with the corresponding OFDMA zones can be said to be "bursty" (e.g., infrequent, non-continuous, periodic, etc.). Conventional OFDMA power controls do not adjust OFDMA power settings during the "gaps" between OFDMA transmission bursts. An example will now be given wherein CDMA signaling, which is more or less continuous, is used to adjust OFDMA power controls during lapses of transmissions between OFDMA bursts.

In the following example, the definitions set forth in the description given above with respect to the calculation of step S655 of FIG. 6B are hereby incorporated by reference.

FIG. 7 illustrates an OFDMA reverse link power control process according to another example embodiment of the present invention.

In step S700, the UE 305 has established a connection with the Node B 120 and is transferring data via CDMA protocols within the CDMA zones of the bandwidth allocation 400 of the hybrid CDMA/OFDMA system 300 of FIG. 3. In step S700, it is assumed that no OFDMA bursts have yet occurred. An "initial" OFDMA pilot transmit power, that is, an OFDMA pilot transmit power level established before a first OFDMA for use in the first OFDMA burst, is established in step S705 at the UE 305, and is expressed by $$Po(t)=\alpha(t)*Pc(t) \quad \text{Equation 7}$$

wherein the initial power ratio $\alpha(t)$ is set to a default level determined by a system engineer.

The transmit power level for "initial" OFDMA traffic levels is either established by multiplying Po(t) with a rate-dependent traffic-to-pilot ratio (TPR) or by defining a pilot boost value that is rate-dependent. Here, "rate-dependent" means that the TPR or pilot boost values are based on different SINR requirements associated with different transmission rates.

In step S710, the UE 305 transmits OFDMA data on one or more of the OFDMA zones. The Node B measures the SINR for the received OFDMA burst in step S715 and compares the measured OFDMA SINR with a target OFDMA SINR in step S720. The target OFDMA SINR may be a fixed value, an adaptive value, etc.

If the hybrid CDMA/OFDMA system 300 allows an independent OFDMA bit for power adjustments, the Node B 320 sends the independent OFDMA bit in step S725. Alternatively, if no such independent OFDMA bit provision is provided in the hybrid CDMA/OFDMA system 300, the SINRs are estimated simultaneously in step S725. In other words, a single power control bit or common bit is used to adjust both CDMA and OFDMA transmissions at the UE 305. The common bit is determined based on both the OFDMA and CDMA SINRs.

The OFDMA burst beginning in step S710 ends at step S730. During the gap between OFDMA bursts, the Node B 320 estimates the OFDMA SINR in step S735 using the expression $$\Gamma o,est(t)=\Gamma c(t)*\alpha_{est}(t)*\beta(t) \quad \text{Equation 8}$$

wherein $\Gamma o, est(t)$ is an estimated OFDMA SINR for a slot t, $\alpha_{est}(t)$ is an estimated power ratio for the slot t, and $\beta(t)$ is a correlation factor for the slot t.

The estimated OFDMA SINR $\Gamma o, est(t)$ is compared to the target OFDMA SINR $\Gamma o$ in step S740, and the Node B 320 sends an OFDMA transmit power control (TPC) bit to the UE 305 in step S745 based on the comparison. A TPC bit is a single bit binary indicator, which is set to a first logic level (e.g., a higher logic level or "1") to instruct a UE (e.g., UE 305) to increase transmission power by a fixed amount and a second logic level (e.g., a lower logic level or "0") to instruct a UE (e.g., UE 105) to decrease transmission power by the fixed amount. In an example, if the comparison of step S745 indicates that the estimated OFDMA SINR is less than the target OFDMA SINR, the Node B 320 sends a TPC bit having the first logic level (e.g., a higher logic level or "1") to the UE 305. Otherwise, the Node B 320 sends a TPC bit having the second logic level (e.g., a lower logic level or "0") to the UE 305.

While the estimated OFDMA SINR $\Gamma o, est(t)$ is not used during OFDMA bursts because actual measured OFDMA SINR values are available, the correlation factor $\beta(t)$, used during OFDMA burst gaps, is updated during the OFDMA bursts to make the estimated OFDMA SINR $\Gamma o, est(t)$ more accurate during OFDMA gaps. Accordingly, the correlation factor $\beta(t)$ is updated in step S750 during OFDMA bursts with the following expression $$\beta(t)=(1-\lambda)*\beta(t-1)+\lambda*\Gamma o(t)/(\Gamma c(t)*\alpha_{est}(t)) \quad \text{Equation 9}$$

wherein $\lambda$ is a forgetting factor between 0 and 1. The forgetting factor is a constant value determined by a system engineer.

Maximum Mobile Station Transmit Power

An example of establishing a maximum power per tone threshold for the UE 305's transmissions will now be described. In an example, UEs located near edges or boundaries of cells (e.g., between Node B 120 and Node B 125) have more affect on neighboring cell's interference as compared to UEs located in close proximity to a serving Node B (e.g., near a centered position of the cell). If no control is maintained on the peak power with which a given UE may transmit, overall system interference may increase. The following example of establishing a peak power per tone or maximum transmit power level for a UE within the hybrid CDMA/OFDMA system 300 of FIG. 3 is given as a function of the UE's location with respect to a plurality of cells. Further, while the below example embodiments are described with respect to the UE 305 having the Node B 320 as a serving Node B and the Node B 325 as a neighboring Node B, this particular arrangement is given for example purposes only and it will be readily apparent that the below maximum transmit power control process may alternatively be applied at any UE within the hybrid CDMA/OFDMA system 300.

Each of the Node Bs (e.g., Node Bs 120, 125, etc.) within the hybrid CDMA/OFDMA system 300 periodically measures an amount of received outer-cell interference (e.g., interference from cells other than a Node B's own cell). Each of the Node Bs compares the measured outer-cell interference with an outer-cell interference threshold $Io_{thresh}$. In an example, the RNC 330 may set the outer-cell interference threshold $Io_{thresh}$ for the Node Bs 320/325. Each of the k Node Bs transmits (e.g., to all UEs within range, such as the UE 305) an Interference Activity Bit (IAB) based on the comparison. In an example, referring to a Node B "p", if the comparison indicates that the measured outer-cell interference is greater than the outer-cell interference threshold $Io_{thresh}$, then IAB(p)=1, wherein Node B p is representative of one of the Node Bs within the hybrid CDMA/OFDMA system 300. Otherwise, if the comparison indicates that the measured outer-cell interference is not greater than the outer-cell interference threshold $Io_{thresh}$, then IAB(p)=0. It is understood that the IABs may be transmitted from one or more Node Bs at once such that multiple IABs may be received by a UE within the hybrid CDMA/OFDMA system 300, in part based on the UE's position relative to neighboring or serving Node Bs within the hybrid CDMA/OFDMA system 300. A maximum transmit power per tone threshold adjustment process, performed at the UEs within the CDMA system 100, taking into account the IABs transmitted by the Node Bs will now be described below with respect to a representative UE 305 in FIG. 8.

Figure 8:
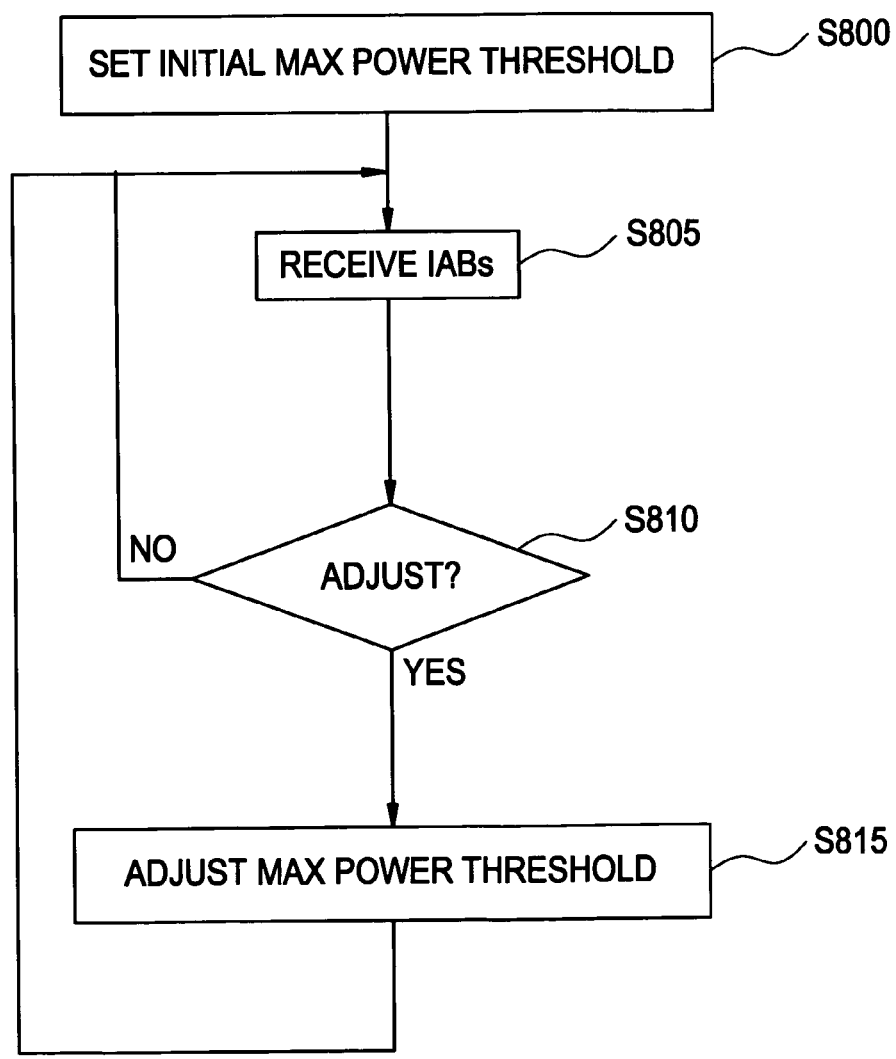
FIG. 8 illustrates a process of establishing a maximum transmit power per tone threshold for a mobile station's transmissions according to an example embodiment of the present invention.

FIG. 8 illustrates a process of establishing a maximum transmit power per tone threshold for a UE's transmissions according to an example embodiment of the present invention. The example embodiment of FIG. 8 is described below with respect to a representative UE (e.g., UE 305) and k Node Bs (e.g., Node B 120, 125, etc.) within the hybrid CDMA/OFDMA system 300, wherein k is an integer greater than or equal to 1. The steps illustrated in FIG. 8 and described below are performed at, for example, the UE 305 of FIG. 3. The representative UE 305 is not necessarily in active communication with more than one of the k Node Bs (e.g., although it may be, such as in soft handoff mode), but the representative UE 305 is capable of "listening" to or receiving signals from all of the k Node Bs. Accordingly, it will be appreciated that the number k may vary based on the UE 305's position within the hybrid CDMA/OFDMA system 300. For example, if the UE 305 is in very close proximity to a serving Node B such as Node B 120, k typically equals 1. As the UE 305 becomes closer to an edge of a cell, k is typically greater than 1.

In the example embodiment of FIG. 8, in step S800, the maximum transmit power per tone threshold of the UE 305 being served by the Node B 320 is initialized, by the UE 305, to $$P_{max}(1)=Io_{thresh}/\max(G(d)), d=1,\ldots,k \quad \text{Equation 10}$$

wherein $P_{max}(1)$ denotes a maximum power for an initial time period, $Io_{thresh}$ denotes an outer-cell interference threshold (e.g., an amount of outer-cell interference that can be tolerated), and G(d) denotes an average channel gain from the UE 305 to a dth Node B among the k Node Bs, wherein d is an integer from 1 to k. In an example, the G(d) measurements are based on SINR measurements on the common pilot and preamble, and the outer-cell interference threshold $Io_{thresh}$ is determined by a design engineer.

The UE 305 receives the IABs (discussed above prior to FIG. 8) from each of the k Node Bs in step S805 and determines whether an adjustment to the maximum transmit power per tone threshold is required in step S810. If step S810 determines that an adjustment is necessary, a power adjustment is calculated for the UE 305 in step S815. Otherwise, the process returns to step S805. In step S815, the UE 305 establishes a token bucket for the transmission power resource called $Pc_{bucket}(t)$, which denotes the instantaneous updated value of the transmit power resource based on the received IABs, expressed as $$Pc_{bucket}(t)=Pc_{bucket}(t-1)-\Delta P_{down} \quad \text{Equation 11}$$

if any of the IABs received by the UE 305 are set to "1", wherein $\Delta P_{down}=w^*\max(G(y))$, wherein y denotes y Node Bs among the k Node Bs which are sending the IAB equal to "1" at time t, and w is a fixed weight factor determined by a design engineer.

$Pc_{bucket}(t)$ is alternatively expressed as $$Pc_{bucket}(t)=Pc_{bucket}(t-1)+\Delta P_{up} \quad \text{Equation 12}$$

if all of the IABs received by the UE 305 are set to "0", wherein "t" denotes a current time period and "t−1" denotes a previous time period, and
$\Delta P_{up}$ is expressed by $$\Delta P_{up}=[x/(1-x)]\Delta P_{down}$$

wherein x is equal to the probability that the outer-cell interference measured by a given Node B is greater than the outer-cell interference threshold $Io_{thresh}$. In an example, the probability "x" is based on a coverage requirement for the given Node B (e.g., Node B 320). In a further example, the probability "x" is determined during deployment or installation of the hybrid OFDMA/CDMA system 300.

$P_{bucket}(t)$ is an averaged version of $Pc_{bucket}(t)$, and is expressed as $$P_{bucket}(t)=P_{bucket}(t-1)+Pc_{bucket}(t)-P_{max}(t-1) \quad \text{Equation 13}$$

$P_{max}(t)$ evaluates to $$P_{max}(t)=\min(P_{max}(t-1),P_{bucket}(t)) \quad \text{Equation 14}$$

if a new encoder packet is scheduled for transmission from the UE 305 to the Node B 320, and $$P_{max}(t)=P_{bucket}(t)-P_{margin} \quad \text{Equation 15}$$

if a new encoder packet is not scheduled for transmission, wherein $P_{margin}$ is an offset value which is greater than or equal to 0 to ensure the bucket does not become empty during the transmission of the encoder packet. In an example, a data rate for the new encoder packet is selected such that $P_{max}(t)$ is set to a sufficient power level so as to achieve a threshold level of spectral efficiency.

Once the maximum transmit power per tone threshold $P_{max}(t)$ is set in accordance with one of Equations 14 and 15 in step S815, the process returns to step S605.

Accordingly, with the above example methodology described with respect to FIG. 8, one of ordinary skill in the art will appreciate that UEs closer to a greater number of Node Bs (e.g., further away from a serving Node B and closer to cell edges) adjust the maximum transmit power per tone threshold with larger steps, whereas UEs closer in proximity to the serving Node B react more slowly to the IAB bits. The combination of the pilot reference power (Po(t)) and the maximum allowed data/pilot power may be used in the computation of the spectral efficiency as requested by the UE.

Further, an alternative example of establishing and adjusting a CDMA maximum transmit power per chip threshold is described in US patent application UNKNOWN#, entitled "METHODS OF REVERSE LINK POWER CONTROL", filed concurrently with this application by the inventors of the subject application, hereby incorporated by reference in its entirety.

Example embodiments of the present invention being thus described, it will be obvious that the same may be varied in many ways. For example, it is understood that a Node B and a UE may alternatively be referred to as a base station (BS) or access network (AN) and a mobile station (MS), access terminal (AT) or mobile unit (MU), respectively. Further, while above described with respect to CDMA/OFDMA systems, it will be readily apparent how the same may be adapted for use in UMTS systems.

Such variations are not to be regarded as a departure from the example embodiments of the invention, and all such modifications are intended to be included within the scope of the invention.

We claim:

1. A method of determining a maximum permitted transmission power level, comprising:
   receiving at a mobile station a plurality of interference indicating signals from different base stations; and
   determining whether to adjust a maximum transmit power threshold of the mobile station based on the plurality of interference indicating signals, the maximum transmit power threshold indicating the maximum permitted transmission power level below which transmissions by the mobile station are constrained; and
   adjusting the maximum transmit power threshold of the mobile station by a first value based on a probability that an interference indicating signal of the plurality of interference indicating signals is greater than the maximum power transmit threshold, the first value being based on a quantity of the different base stations.

2. The method of claim 1, further comprising:
   increasing the maximum transmit power threshold if at least one of the plurality of interference indicating signals indicates an outer-cell interference exceeding an outer-cell interference threshold; and
   decreasing the maximum transmit power threshold if the plurality of interference indicating signals do not include at least one interference indicating signal indicating an outer-cell interference exceeding the outer-cell interference threshold.

3. The method of claim 2, wherein the decreasing step decreases the maximum transmit power threshold by a fixed amount.

4. The method of claim 2, wherein the increasing step increases the maximum transmit power threshold by a fixed amount.

5. The method of claim 1, wherein the maximum transmit power threshold is associated with one of a power per tone and a power per chip.

* * * * *